United States Patent
Fowler

[11] 3,832,787
[45] Sept. 3, 1974

[54] MAGNETIC COMPASS MOUNTING
[75] Inventor: John T. Fowler, Winthrop, Mass.
[73] Assignee: Arthur D. Little, Inc., Cambridge, Mass.
[22] Filed: Aug. 20, 1973
[21] Appl. No.: 389,898

[52] U.S. Cl. .................................. 33/358, 248/176
[51] Int. Cl. ..................... G01c 17/38, G01c 17/18
[58] Field of Search ............ 33/356, 357, 358, 359, 33/355; 248/17 G, 27

[56] References Cited
UNITED STATES PATENTS

| 780,374 | 1/1905 | Negus et al. | 33/358 |
| 2,090,564 | 8/1937 | Zimmerman | 248/27 |
| 2,873,536 | 2/1959 | Rieger | 33/359 |
| 2,903,798 | 9/1959 | Taylor | 33/359 |
| 3,210,860 | 10/1965 | Lieberman et al. | 33/356 |

FOREIGN PATENTS OR APPLICATIONS

| 773,369 | 4/1957 | Great Britain | 33/358 |

OTHER PUBLICATIONS

Danforth Constellation Express Compass; Shown on Page 9; Catalog M16, Goldbergs'; 3 West 46th St.; New York, NY, 10036, Copyright 1972, Copy with W. D. Martin, Jr., AU 243.

Primary Examiner—Louis R. Prince
Assistant Examiner—John W. Shepperd
Attorney, Agent, or Firm—Weingarten, Maxham & Schurgin

[57] ABSTRACT

A magnetic compass mounting operative for installation of the compass on either bottom or top mounting surfaces and including compensating magnets to offset the effects of magnetic deviation and a rotational adjustment for calibrated positioning of the compass such as for magnetic variation correction.

8 Claims, 2 Drawing Figures

PATENTED SEP 3 1974 3,832,787

MAGNETIC COMPASS MOUNTING

FIELD OF THE INVENTION

This invention relates to magnetic compasses and more particularly to mounting apparatus for remote reading compasses.

BACKGROUND OF THE INVENTION

In remote reading compasses such as shown in copending patent application Ser. No. 279,723 entitled "Digital Compass," a compass card is employed having coded indicia thereon which are sensed by photoelectric or other means to provide an electrical signal representative of compass heading and which signal is conveyed to display or other utilization apparatus usually located remote from the compass. The compass can be mounted in any convenient location about a vessel, or other body in which the compass is employed, in alignment with or parallel to the keel line of the vessel. With the vessel on an even keel, the compass card should be in substantially horizontal disposition, and it would be desirable to provide mounting apparatus for such compasses wherein installation can be accomplished for different mounting positions while maintaining proper card orientation.

SUMMARY OF THE INVENTION

In accordance with the invention, a magnetic compass mounting is provided for readily installing the compass on either a bottom or top mounting surface of a vessel or other body in which the compass is employed. The compass itself is contained within a spherical enclosure having a radially extending flange circumferentially disposed at the diameter of the sphere, the flange being adapted for attachment to an associated housing in either a first or second position. The housing to which the enclosure is attached is of cylindrical configuration having a flange near one end configured to receive for attachment the mounting flange of the enclosure. Disposed near the other end of the housing are a pair of orthogonally disposed nonmagnetic rods to each of which are mounted a pair of magnets which are rotatable for providing compensation for the effects of magnetic deviation. The housing includes a calibrated scale cooperative with the enclosure in either installed position for initially aligning compass orientation.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
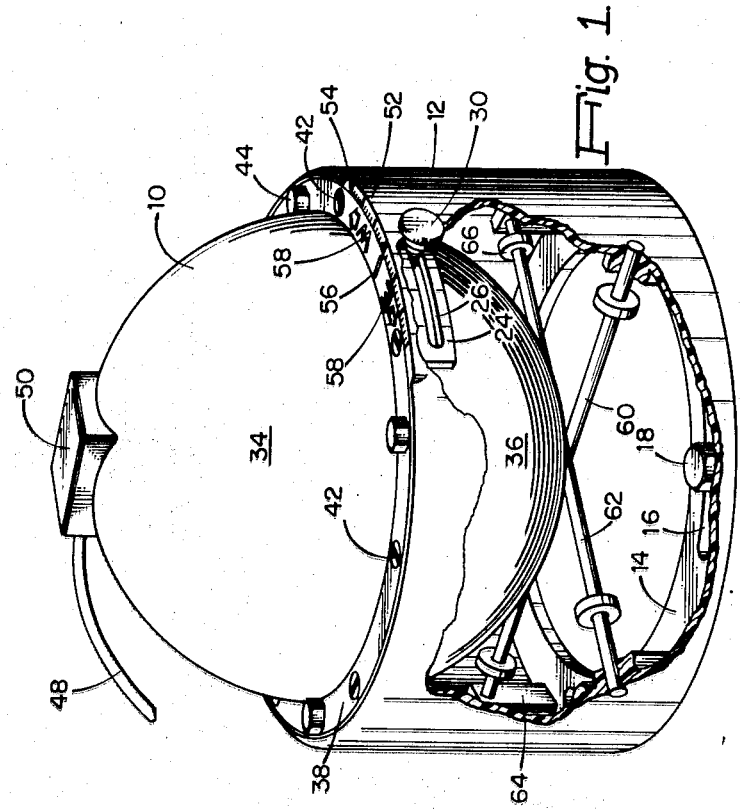
FIG. 1 is a pictorial view, partly cut away, of a compass according to the invention.

A remote reading compass mounting according to the invention is shown in FIG. 1 and includes a spherical enclosure 10 containing the magnetic compass structure and a supporting cylindrical housing 12. The housing 12 includes at one end thereof an inwardly directed lip portion having elongated slots 16 circumferentially arranged around lip portion 14 and by which housing 12 is affixed to a mounting surface such as by fasteners 18 cooperative with slots 16. In the embodiment of FIG. 1, housing 12 is mountable on a bottom mounting surface for support of enclosure 10 as illustrated, while, in the embodiment of FIG. 2, housing 12 is shown mountable to a top mounting surface for support of enclosure 10 which in the latter instance depends from the housing. The compass enclosure 10 is thus readily mounted in proper orientation on either bottom or top mounting surfaces.

Housing 12 includes near the end opposite lip portion 14 a circumferential groove 20 in which is rotatably supported an annular flange 22 having an orthogonally extending segment 24 confronting a portion of the inner wall of housing 12 and through which is provided an elongated circumferentially extending groove 26. An opening 28 is provided through the wall of housing 12 in alignment with the groove 26 and a fastener, such as a machine screw 30 and associated nut 32, is employed as shown to secure segment 24 and flange 22 with respect to housing 12 and thereby lock flange 22 and enclosure 10 attached thereto at a desired angular disposition.

The compass enclosure 10 is typically fabricated of two hemispherical sections 34 and 36 each having a respective circumferential flange 38 and 40. These flanges 38 and 40 are joined together such as by fasteners 42 to provide a spherical enclosure. Openings are provided at selected positions through the mating flanges 38 and 40, and fasteners such as bolts 44 are installed through these openings and through corresponding openings in flange 22 and secured by associated nuts 46. Either flange 38 or 40 can be secured to flange 22, depending on the mounting configuration employed, and, when affixed to flange 22, the visible flange 38 or 40 has the outer surface thereof aligned with the rim of housing 12.

The compass enclosure 10 includes therein a compass card and associated compass magnet supported by a gimbal assembly for maintenance of a substantially horizontal card disposition and for rotation about the card axis. The enclosure 10 is usually filled with a damping liquid to minimize spurious motion of the compass card during spurious movements of a vessel on board which the compass is installed. The compass structure is itself the subject of the aforesaid copending application and wherein the compass card includes coded tracks thereon which are photoelectrically sensed and electronically processed to provide an electrical output signal indicative of compass heading. The output signal is transmitted via an electrical cable 48 to a numerical display or other utilization apparatus located remote from enclosure 10 such as in the cockpit or wheelhouse of a vessel. The enclosure 10 is substantially sealed from the environment and cable 48 is coupled to the circuitry within enclosure 10 by means of a terminal box 50 integral with hemisphere 34.

Figure 2:
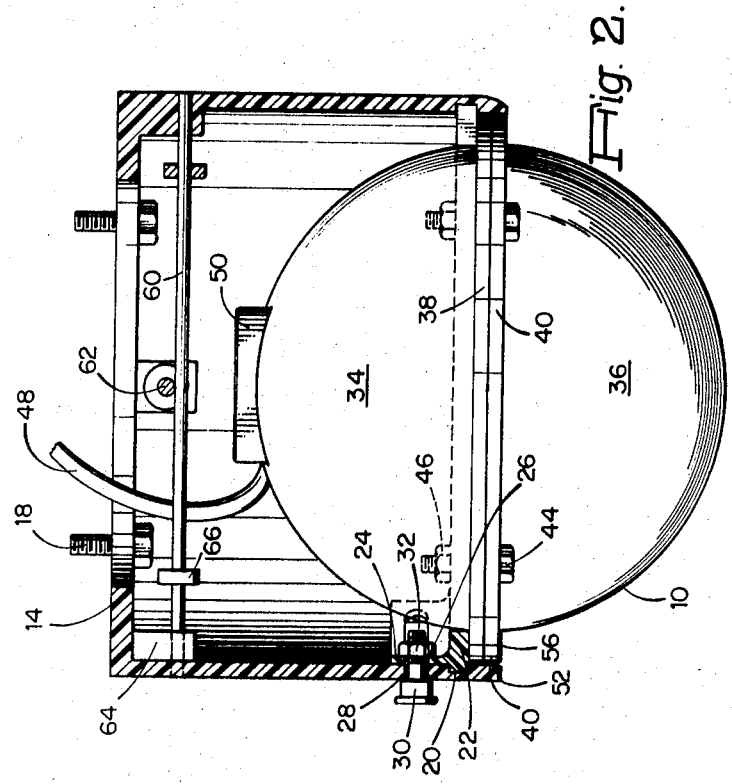
FIG. 2 is an elevation view, partly in section, of the embodiment of FIG. 1 shown in a second mounting configuration.

Housing 12 includes a portion 52 calibrated to indicate angular positions to either side of a 0° reference. The degree markings 54 are read in conjunction with a fiducial mark 56 provided on the outer surface of respective flanges 38 and 40. The flanges 38 and 40 also contain east and west deviation markings 58 to indicate the direction to which enclosure 10 is to be moved with respect to base 12 such as for correct magnetic variation. With the enclosure 10 bottom mounted as shown in FIG. 1, the fiducial mark 56 of flange 38 employed with markings 54 to orient the compass. With the compass top mounted as shown in FIG. 2, the fiducial mark 56 of flange 40 is employed with markings 54 to denote the rotational orientation of the compass. The rotational position of enclosure 10 with respect to housing 12 once determined is locked by means of fastener 30.

Housing 12 also includes a plurality of compensating magnets for minimizing the effects of magnetic deviation such as caused by spurious magnetic fields and magnetic material masses present in the vicinity of the compass. A first rod 60 and a second rod 62 are disposed across orthogonal diameters of housing 12 by means of respective mounting blocks 64 affixed to or integral with housing 12. The rods 60 and 62 are of any suitable non-magnetic material such as stainless steel. Four compensating magnets 66 are provided, each disposed near a respective end of a mounting rod. In the illustrated embodiment, cylindrical magnets are shown although it will be appreciated that magnets of other configurations, such as bar magnets, can equally well be employed. The magnets 66 are rotatable on the rods 60 and 62 to adjust the magnetic axis of each to provide an intended compensating magnetic field in the vicinity of the compass.

For proper compass operation, housing 12 is installed on a mounting surface, which may be either a bottom or top mounting surface, and is rotationally oriented to align the compass card along or parallel to the keel line or longitudinal axis of the vessel or other body on which the compass is being employed. Magnetic variation for a particular geographical location can be compensated by angular adjustment of enclosure 10 in conjunction with calibration markings 54. The rotational adjustment of enclosure 10 also permits angular adjustment of the installed compass position in the event that housing 12 is rotationally misaligned to its mounting surface during initial installation.

The mounting structure is typically formed of a suitable plastic material such as Lexan and, typically, the housing 12 is integrally moled with the associated flange 14 and mounting blocks 64.

Various modifications and alternative implementations will occur to those versed in the art, and it is not intended to limit the invention by what has been particularly shown and described except as indicated in the appended claims.

What is claimed is:

1. A compass mounting comprising:
 a spherical enclosure containing a remote reading magnetic compass and including a circumferential flange, said flange having upper and lower opposite facing surfaces, each containing a fiducial mark at a common angular position;
 a cylindrical housing having a mounting flange on one end thereof adapted for attachment to a bottom or top mounting surface;
 an annular flange disposed near the end of said housing opposite said mounting flange and arranged for rotation with respect to said cylindrical housing;
 means for securing said circumferential flange to said annular flange for rotation as a unit, said circumferential flange being securable with either facing surface visible in accordance with the mounting position of said housing;
 a circumferentially extending plate integrally formed with said annular flange and disposed in confronting relation with a portion of the inner wall of said cylindrical housing and having an elongated circumferentially extending slot therein;
 means on said housing cooperative with said slot for securing said compass enclosure in predetermined angular disposition with respect to said housing;
 said housing having a surface substantially coplanar with the visible facing of said circumferential flange and including degree markings thereon cooperative with said fiducial mark for calibrating the rotational disposition of said enclosure with respect to said housing.

2. A compass mounting according to claim 1 wherein said upper facing surface of said circumferential flange is in engagement with said annular flange when said housing is bottom mounted, and said lower facing circumferential flange surface is in engagement with said annular flange when said housing is top mounted.

3. A compass mounting according to claim 1 wherein said substantially coplanar surface is on a circumferentially extending segment integrally formed with said housing and disposed at the rim thereof adjacent to said visible facing.

4. A compass mounting according to claim 1 wherein said cylindrical housing includes
 first and second mounting rods of non-magnetic material, each disposed across a diameter of said housing and in orthogonal disposition to the other; and
 a plurality of magnets, each disposed at a respective end of a mounting rod and each rotationally adjustable on said rod for providing a compensating magnetic field.

5. A compass mounting according to claim 4 wherein said cylindrical housing includes first and second pairs of mounting blocks integral with said housing at positions to support said mounting rods respectively across orthogonal diameters of said housing.

6. A compass mounting according to claim 1 wherein said cylindrical housing includes a groove circumferentially disposed in the inner wall thereof, said annular flange having an outwardly extending lip engageable by said circumferential groove and rotational therein.

7. A compass mounting according to claim 6 wherein said cylindrical housing mounting flange includes a plurality of circumferentially extending slots therethrough operative to receive fastening means for attachment of said cylindrical housing to a bottom or top mounting surface and to permit rotational adjustment of said housing.

8. A compass mounting according to claim 6 wherein said spherical enclosure includes a terminal box integral therewith and by which said remote reading magnetic compass is adapted to be electrically coupled to utilization apparatus.

\* \* \* \* \*